Figure 4:
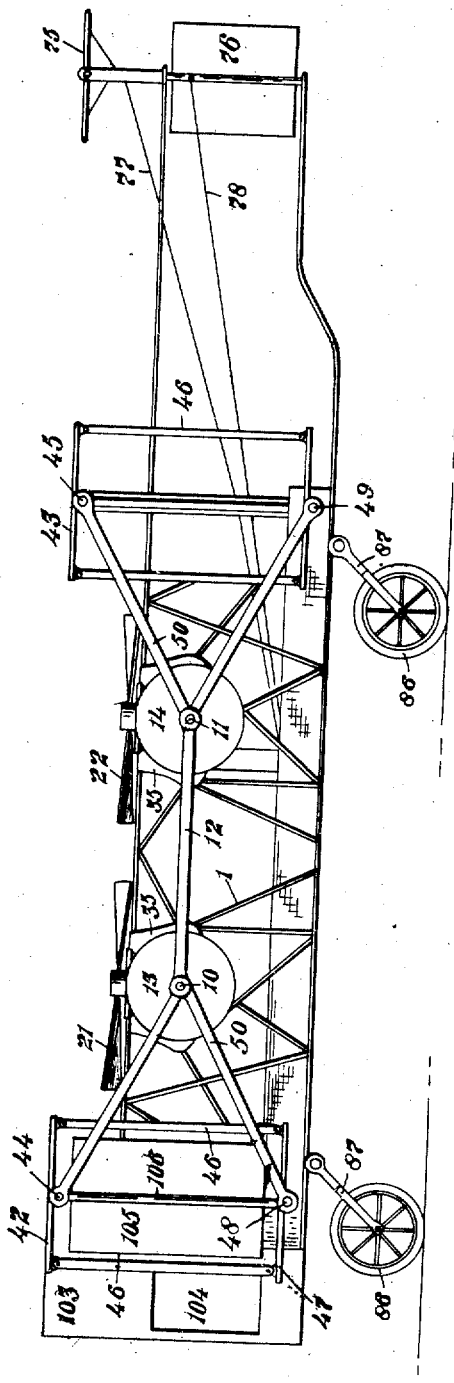

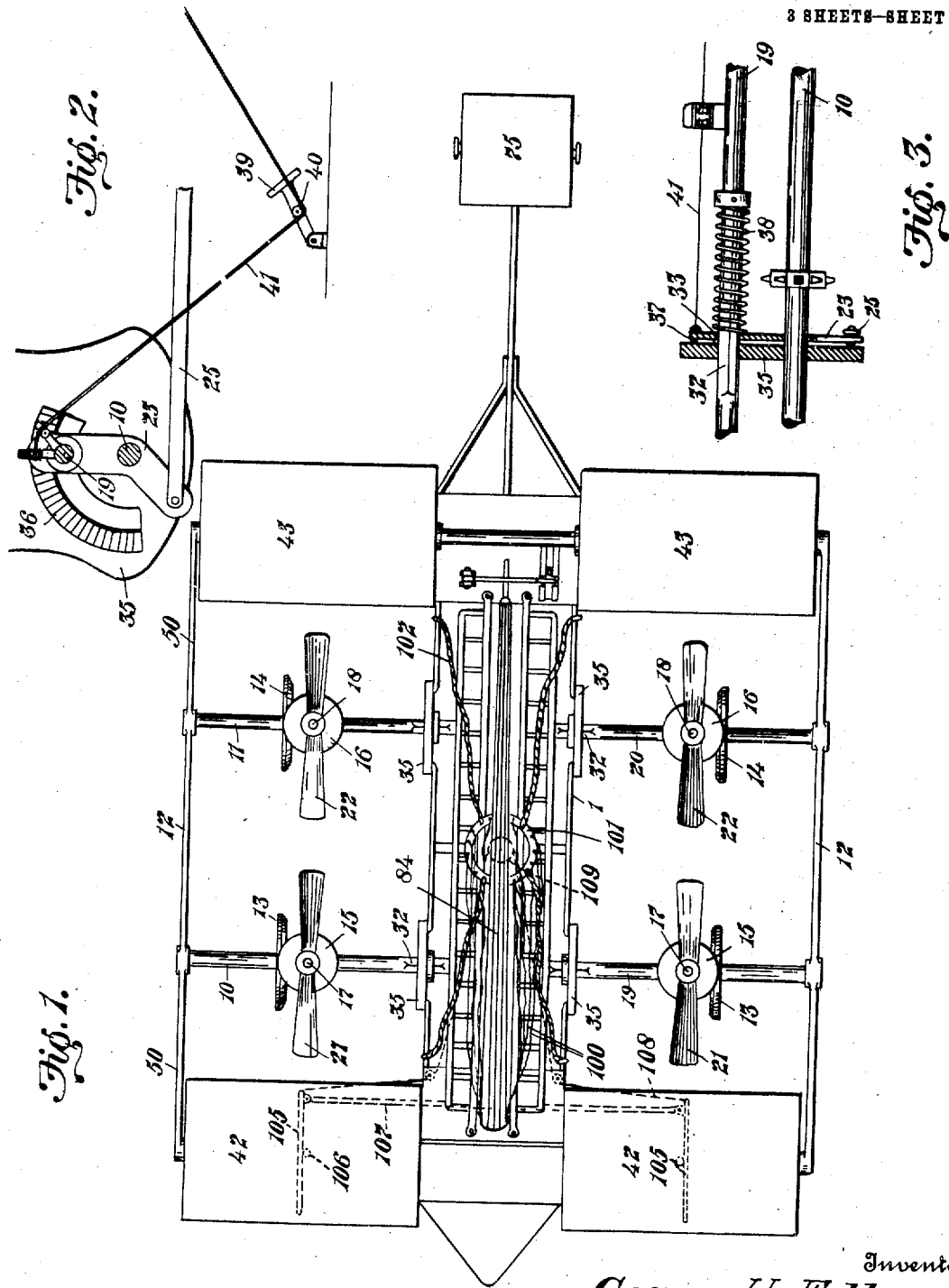

G. H. FELLER.
AEROPLANE.
APPLICATION FILED MAR. 14, 1912.

1,039,716.

Patented Oct. 1, 1912.
3 SHEETS—SHEET 2.

Witnesses
Hazel Own
Sylvia Boron

Inventor
George H. Feller
By Bond & Miller
Attorney

G. H. FELLER.
AEROPLANE.
APPLICATION FILED MAR. 14, 1912.
1,039,716.
Patented Oct. 1, 1912.
3 SHEETS—SHEET 3.
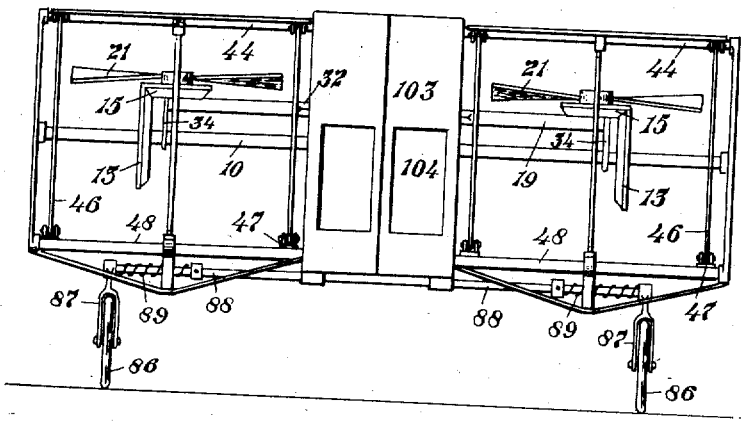
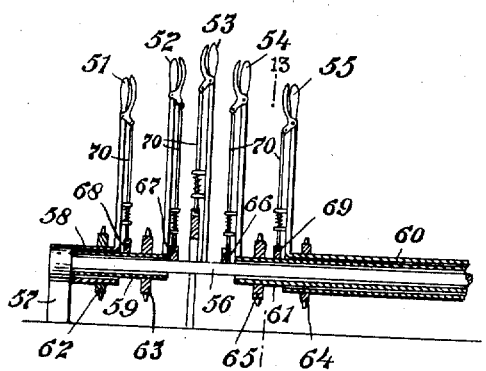
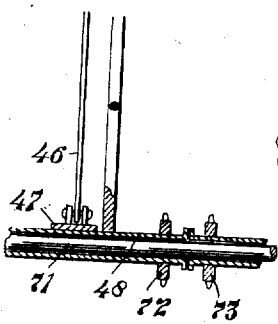
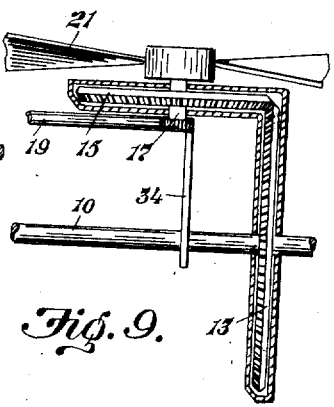
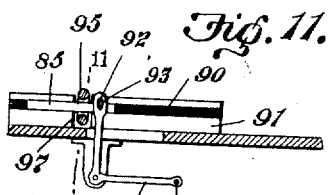
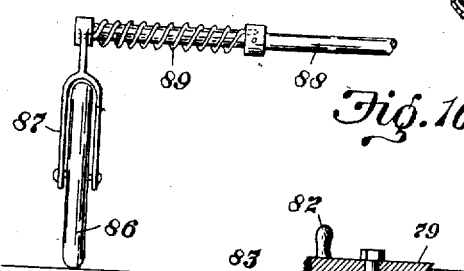
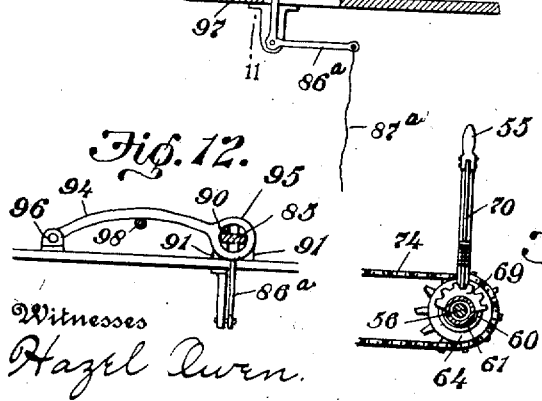
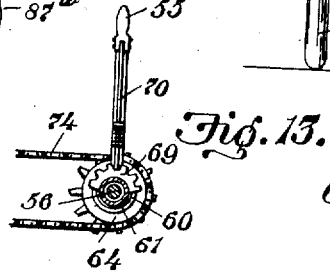
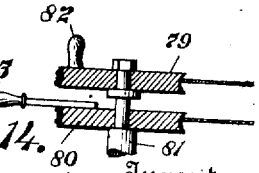
Witnesses
Hazel Owen
Sylvia Born
Inventor
George H. Feller
By Bond + Miller
Attorney

UNITED STATES PATENT OFFICE.

GEORGE H. FELLER, OF BEACH CITY, OHIO.

AEROPLANE.

1,039,716.  Specification of Letters Patent.  Patented Oct. 1, 1912.

Application filed March 14, 1912. Serial No. 683,770.

*To all whom it may concern:*

Be it known that I, GEORGE H. FELLER, a citizen of the United States, residing at Beach City, in the county of Stark and State of Ohio, have invented certain new and useful Improvements in Aeroplanes; and I do hereby declare the following to be a full, clear, and exact description of the same, such as will enable others skilled in the art to which it appertains to make and use the same, reference being had to the accompanying drawings, and other means of reference marked thereon, which form a part of this specification.

This invention relates to improvements in aeroplanes or aerial machines and the objects of the invention being, first to provide mechanism whereby the aeroplane can be raised in a vertical plane as soon as the machine is put in motion, and second, to provide means for controlling the propelling mechanism in such a manner that the aeroplane may be controlled, that is to say may be propelled in a horizontal plane or at any angle.

A further object is to provide means for controlling and adjusting the propellers in such a manner that the machine proper can be easily guided.

These main objects and many minor ones I accomplish by means of the various devices arranged and so connected that the manipulation of the various movable and adjustable parts can be easily controlled.

In the drawings similar numerals of reference refer to corresponding parts in the several views.

Figure 5:
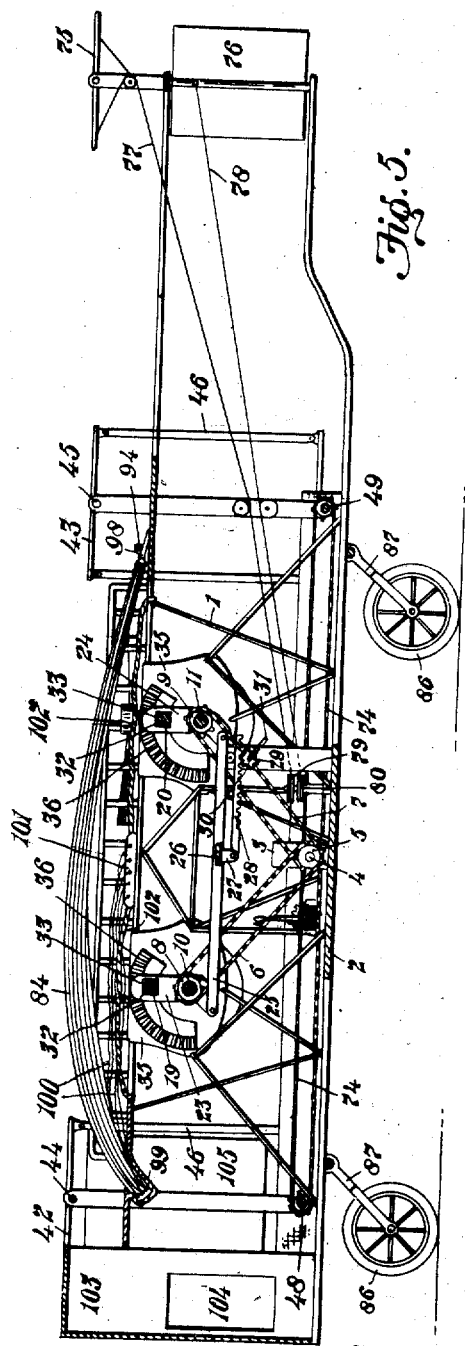

Figure 1 is a top plan view. Fig. 2 is a transverse section through the propeller actuated shaft and a side elevation of the propeller shifting mechanism. Fig. 3 is a longitudinal section of the propeller actuating shaft, the propeller oscillating shaft and devices for holding the propeller in fixed adjustment. Fig. 4 is a side elevation. Fig. 5 is a longitudinal vertical section. Fig. 6 is a front end elevation. Fig. 7 is a section of the plane controlling mechanism, consisting of hollow shafts and levers. Fig. 8 is a longitudinal section showing a portion of the fixed bar and the plane rock shafts and gear. Fig. 9 is a view showing one of the propellers and the necessary gear for rotating the same. Fig. 10 is a view showing one of the ground wheels mounted upon the rock shaft. Fig. 11 is a detailed section of the parachute releasing device. Fig. 12 is a sectional view on line 11—11, Fig. 11. Fig. 13 is a section on line 13—13, of Fig. 7. Fig. 14 is an enlarged sectional view of the two steering wheels for the vertical and horizontal planes of the rudder.

Similar numerals of reference indicate corresponding parts in all the figures of the drawing.

In the accompanying drawings, 1 represents the skeleton frame made up of suitable bars and so arranged as to provide means for attaching the various fixed and movable parts hereinafter described. The bottom or floor 2 is made up of light material such as commonly used in devices of the character to which my invention pertains upon which floor is located the motor 3, which motor may be of any desired construction or of any kind suitable for aerial navigation preferably gasolene. Upon the engine shaft 4 are located sprocket wheels 5, which sprocket wheels must necessarily be located side by side but in Fig. 5, one sprocket wheel is shown, and the drive chains 6 and 7 are illustrated side by side at their bottom or lower ends.

The drive chains 6 and 7 extend upward and around the sprocket wheels 8 and 9, said sprocket wheels being securely mounted upon the long propeller actuating shafts 10 and 11, which shafts are properly journaled in the side bars 12. Upon the shafts 10 and 11 are mounted and securely fixed the beveled gear wheels 13 and 14, which beveled gear wheels mesh with the beveled gear wheels 15 and 16, which beveled gear wheels 15 and 16 are fixedly connected to the propeller shafts 17 and 18, said propeller shafts 17 and 18 being journaled in suitable bearings formed in the oscillating bars 19 and 20 and to the propeller shafts 17 and 18 are securely connected the propellers 21 and 22, which propellers are for the purpose of lifting and propelling the aeroplane. The propellers 21 and 22 are so geared that they will all rotate in unison and all exert an equal lifting or propelling force.

It will be understood that in order to shift the direction of the areoplane that is to say from the vertical movement to a horizontal or inclined movement it will be necessary to bring the propellers 21 and 22 into different angles and in order to accomplish this the rock-levers 23 and 24 are provided, which rock-levers are journaled upon the propeller shafts 10 and 11. For the purpose of rocking the rock levers 23 and 24 in unison they are coupled together by means of the bars 25, which bars are tied together by the cross bar 26 to which cross bar is attached the downward extending lug 27, to which lug is attached the rack bar 28, which rack bar meshes with the pinion 29, which pinion is mounted upon the short shaft 30, said shaft being provided with the operating lever 31.

It will be understood that when the rock levers 23 and 24 are rocked by means of the rack bar and pinion, the oscillating bars 19 and 20 will be carried with the top or upper ends of the rock bars 23 and 24 and in order to prevent any axial movement of the oscillating bars 19 and 20, said oscillating bars are provided with the angled portions 32, which angled portions are located through angled apertures 33 formed in the rock levers 23 and 24.

It will be understood that the opposite ends of the oscillating bars 19 and 20 must be supported and in order to support the oscillating bars 19 and 20 the swinging bars 34 are provided, which are connected at their upper ends to the oscillating bars 19 and 20 and their lower ends journaled upon the propeller shafts 10 and 11.

It will be understood that the propellers must be held in their proper adjustment and for the purpose of so holding the propellers after they have been adjusted or brought into the desired positions, the blocks 35 are provided, which blocks are provided with the toothed segments 36 and the rock bars 23 and 24 provided with teeth 37, which engage the notched segments 36 and in order to normally hold the rock bars 23 and 24 in fixed adjustment the springs 38 are provided, which springs press the rock bars against the block 35. In order to release and free the rock bars 23 and 24 so that they may be rocked so as to bring the propellers into the desired angle, the foot lever or levers 39 are provided which foot levers are provided with the rollers 40 and under which rollers the cords 41 extend and when the levers 39 are pressed down a pulling action will be given to the cords 41, which cords are connected to the top or upper ends of the rock bars 23 and 24 and when the pressure is removed from the foot levers 39 the springs 38 will normally elevate said foot levers and at the same time seat the teeth 37 into the proper notches of the toothed segments 36.

It will be understood that a lateral pull must be given to the rock bars 23 and 24 and in order to provide for this, the cords 41 are extended at substantially right angles to the rock bars 23 and 24 in a lateral direction as best illustrated in Fig. 3.

The oscillating planes 42 and 43 are located and arranged substantially as shown in Figs. 1, 4 and 5, which planes are located at what might be termed the four corners of the aeroplane proper and are pivotally mounted upon the bars 44 and 45 and to the four corners of each of the planes 42 and 43, and at their bottom or under side are pivotally connected the connecting bars 46, which connecting bars are connected at their bottom or lower ends to the rock arms 47, which rock arms are securely mounted upon the rock shafts 48 and 49 which rock shafts are connected to the lower members of the bifurcated ends 50 and the bars 44 and 45 connected to the upper members of the bifurcated ends 50.

For the purpose of providing means for imparting rocking or oscillating movements to the various planes 42 and 43, a series of levers 51, 52, 53, 54, and 55 are provided and said levers manipulated to move from time to time any one particular plane independent of the other or all of the planes in unison. The lever 53 is fixed to the solid rock shaft 56, which is journaled at its ends in suitable bearings 57 fixed to the bottom or platform of the machine proper. The levers adapted to actuate the planes independent of each other are fixedly mounted upon the hollow shafts 58, 59, 60, and 61, and these hollow shafts are concentrically located upon the solid shaft 56 and their inner ends spaced from each other as best illustrated in Fig. 7. The hollow shaft 58 is provided with a sprocket wheel 62, and the hollow shaft 59 is provided with a sprocket wheel 63. The hollow shaft 60 is provided with the sprocket wheel 64 and the hollow shaft 61 is provided with the sprocket wheel 65.

Upon the solid shaft 56 are mounted toothed segments 66 and 67, which toothed segments are engaged by the spring pressed pawls 70. When the lever 53 is moved it carries with it the solid shaft 56, the inner hollow shafts 59 and 61, and the outer hollow shafts 58 and 60, all of said shafts being operatively connected together by means of the toothed segments 66 and 67 upon the solid shaft 56 and 68 and 69 on the hollow shafts 59 and 61 respectively, and the spring pressed pawls 70 upon the levers 51, 52, 53, 54 and 55. The levers 52 and 54 are mounted upon the hollow shafts 59 and 61 respectively, so that when the levers 52 or 54 are rocked they will carry with them the hollow shafts 58, and 59 or 60 and 61 respectively.

By releasing the pawls 70 upon either the levers 51 or 55 the hollow shafts 58 and 60 respectively are thrown out of operative connection with any of the other levers and may be rocked independently, thereby rocking either of the hollow shafts 58 and 60 respectively. The rock shafts 48 and 49 are hollow and are preferably rotatably mounted upon a solid shaft 71. Each of said rock shafts 48 and 49 is made up of two sections, to one of which are connected the rock arms 47, which operate the right hand plane 42 or 43 and to the other section of which are connected the rock arms 47 which operate the left hand plane 42 or 43. To each section is fixedly connected a sprocket wheel, the sprocket wheel 72 connected to the right hand section and the sprocket wheel 73 to the left hand section of the hollow shaft 48 or 49. A sprocket chain 74 is provided for each of the sprocket wheels 62, 63, 64 and 65. The sprocket wheel 72 upon the shaft 48 is connected to the sprocket wheel 62 by means of a chain 74 and the sprocket wheel 73 upon the shaft 48 is connected to the sprocket wheel 63. The sprocket chains 74 also connect the sprocket wheels 64 and 65 to the left and right hand sprocket wheels respectively upon the rear rock bar 49.

The rear end of the aeroplane or machine is provided with the horizontal rudder plane 75 and the vertical rudder plane 76, said planes being pivotally connected in any well known manner, the horizontal plane being for the purpose of deflecting the machine from a true horizontal line and the vertical rudder plane 76 being for the purpose of guiding the machine proper laterally or what might be termed at right angles to the guiding action of the horizontal rudder plane 75. For the purpose of adjusting the rudder planes 75 and 76 suitable cords or chains 77 and 78 are provided, which are operatively connected to the actuating or adjusting pulleys 79 and 80, said pulleys being mounted upon the shaft 81 and each provided with operating handles or levers 82 and 83. Upon the top or upper portion of the machine proper is located a parachute 84 which is held in closed and substantially horizontal position by means of a suitable catch bar 85 to which is pivotally attached the lever 86, which is operated by the cord 87 and when released the parachute is so constructed and arranged that it will be brought into vertical position when it is free to expand in the ordinary manner. The parachute within itself and its particular construction is not described in detail, owing to the fact that it pertains to a separate class of inventions and forms the subject matter of a separate application. The catch bar 85 is slidably mounted within the grooves 90, which grooves are located in the guide members 91. A pin 92 carried by the catch bar 85 engages a slot 93 in the upper extremity of the bell crank lever 86ª. A bar 94 provided with an eye 95 at one extremity is pivoted at its other extremity to a lug 96 carried upon the upper portion of the machine proper. A slot 97 is provided in the guide members 91, which slot is adapted to receive the eye 95. The end of the rod 98 of the parachute is adapted to be held beneath said rod 94. When the parachute is in closed position the catch bar or bolt 85 is passed through the eye 95 as shown in Figs. 11 and 12. When it is desired to release the parachute the cord 87ª is pulled, thereby rocking the bell crank lever 86 and drawing the bolt 85 out of engagement with the eye 95. When the bar 94 is released the spring action of the ribs of the parachute will cause the parachute to be thrown upward in a position to open. The forward end of the parachute is adapted to be located when in closed position in a socket 99 formed in the upward portion of the machine proper. Ropes or wires 100 are attached to the lower extremities of the parachute bars and connected to a ring 101, to which ring are connected heavy cables 102 which are fastened to the frame of the machine.

For the purpose of allowing the machine to be moved upon the ground as an ordinary vehicle the traveling wheels 86 are provided, which traveling wheels are journaled in the yokes 87 which yokes are connected to the rock shafts 88 and the torsion springs 89 are provided, which springs are for the purpose of normally holding the yokes against upward movement at their lower ends so that when the machine lights upon the ground the torsion springs will receive the shock as between the traveling wheels and the ground, thereby eliminating any sudden jar when the machine comes in contact with the ground. At the forward end of the machine and in the center thereof is provided a housing 103, the sides of which preferably form an acute angle. This housing is adapted to keep the rush of air, caused by the forward motion of the machine, away from the aviator, and is provided with transparent panes 104 through which the operator may obtain a view of the path of the machine. Beneath the forward planes 42 are located vertical planes 105, mounted upon shafts 106 and pivotally connected together by means of a bar 107. A cable 108 connects said planes and passes over a steering wheel 109.

Having fully described my invention what I claim as new and desire to secure by Letters Patent, is—

1. In an aeroplane of the character described, the combination of a suitable frame, a motor carried by the frame, twin propellers located at the rear and the front of the frame, rocking planes located at the front and the rear of the propellers, means for moving said planes in unison or independently, vertical planes located beneath said rocking planes and in planes intermediate the ends of said rocking planes, and an independent horizontal plane located at the rear of said planes, a vertical plane located beneath said horizontal plane, and a housing carried upon the forward extremity of said frame.

2. In an aeroplane of the character described, the combination of a frame, a motor carried by said frame, propellers operated by said motor, planes located at the rear and the front of said frame and at opposite sides thereof, said planes mounted upon rock shafts, connecting links pivotally attached to said planes, rock bars located below the planes and the connecting links pivotally connected thereto, and means for rocking the planes, said means consisting of a rock shaft, a rock lever located upon said shaft, hollow rock shafts located upon each side of said rock lever, a rock lever located upon each of said hollow shafts, a second pair of hollow shafts located around said first mentioned hollow shafts, rock levers located upon said second pair of hollow shafts, means connecting said rock shafts to said rock bars, and means for moving each rock shaft independently.

In testimony that I claim the above, I have hereunto subscribed my name in the presence of two witnesses.

GEORGE H. FELLER.

Witnesses:
　DWIGHT E. COTTON,
　JNO. LONGENECKER.